(12) United States Patent
Pervez

(10) Patent No.: US 7,854,087 B1
(45) Date of Patent: Dec. 21, 2010

(54) REMOTELY OPERABLE BAIT DEPLOYING SYSTEM AND ASSOCIATED METHOD

(76) Inventor: Aslam Pervez, 108-05 91st Ave., Apt. 2 L, Richmond Hill, NY (US) 11418

( * ) Notice: Subject to any disclaimer, the term of this patent is extended or adjusted under 35 U.S.C. 154(b) by 0 days.

(21) Appl. No.: 12/587,926

(22) Filed: Oct. 15, 2009

Related U.S. Application Data

(63) Continuation-in-part of application No. 11/998,312, filed on Nov. 29, 2007, now abandoned.

(60) Provisional application No. 60/861,291, filed on Nov. 29, 2006.

(51) Int. Cl.
A01K 91/02 (2006.01)
A01K 79/00 (2006.01)
A01K 91/10 (2006.01)
A01K 97/12 (2006.01)

(52) U.S. Cl. ............... 43/26.1; 43/27.4; 43/4; 43/16; 43/17

(58) Field of Classification Search ........ 43/4, 43/26.1, 27.2, 27.4, 15–17
See application file for complete search history.

(56) References Cited

U.S. PATENT DOCUMENTS

| | | | | |
|---|---|---|---|---|
| 384,853 A * | 6/1888 | Keller | ............................. | 43/15 |
| 578,248 A * | 3/1897 | Layne | ......................... | 43/27.4 |
| 720,643 A * | 2/1903 | Wallace | ....................... | 43/27.2 |
| 1,163,193 A * | 12/1915 | Althoff | ......................... | 43/27.2 |
| 1,642,582 A * | 9/1927 | Hansen | ............................. | 43/4 |
| 1,850,296 A * | 3/1932 | Vermeulen | ................... | 43/26.1 |
| 2,037,232 A * | 4/1936 | Hendriks | ..................... | 43/27.2 |
| 2,064,428 A * | 12/1936 | Hathaway | ....................... | 43/15 |
| 2,420,451 A * | 5/1947 | Spenard | ...................... | 43/26.1 |
| 2,461,356 A * | 2/1949 | Sus et al. | ........................ | 43/16 |
| 2,545,385 A * | 3/1951 | Reppert et al. | ............... | 43/26.1 |
| 2,550,282 A * | 4/1951 | McAvoy | ........................... | 43/4 |
| 2,577,552 A * | 12/1951 | White, Jr. | ....................... | 43/15 |
| 2,693,047 A * | 11/1954 | Lumsden | .................... | 43/26.1 |
| 2,709,316 A * | 5/1955 | McCabe | ...................... | 43/26.1 |
| 2,726,471 A * | 12/1955 | Uus | ............................. | 43/26.1 |
| 2,734,300 A * | 2/1956 | Mandel | ....................... | 43/26.1 |
| 2,803,914 A * | 8/1957 | Ellis | ............................ | 43/26.1 |
| 2,912,782 A * | 11/1959 | Maximov | .................... | 43/27.2 |
| 2,951,307 A * | 9/1960 | Joy et al. | ....................... | 43/26.1 |
| 3,106,796 A * | 10/1963 | Friedland | ..................... | 43/26.1 |

(Continued)

FOREIGN PATENT DOCUMENTS

EP 1005790 A1 * 6/2000

(Continued)

*Primary Examiner*—Darren W Ark

(57) ABSTRACT

A remotely operable fish bait deploying system including a remote controller adapted to be carried by a user, a fishing rod spaced from the remote controller, and a toy vessel anchored to the fishing rod. A first primary line is anchored to the toy vessel and extends rearwardly therefrom. A second primary line is adjustably connected to the actuator interface and trails behind the toy vessel. The actuator interface automatically adjusts a longitudinal length of the second primary line based upon instructions received from the on-board controller. A plurality of flotation members are directly coupled to the second primary line respectively and remain spaced from the first primary line. A plurality of auxiliary lines are directly anchored to each of the flotation members and terminate underwater wherein each auxiliary line is provided with a hook attached to a distal end thereof for holding bait.

20 Claims, 5 Drawing Sheets

U.S. PATENT DOCUMENTS

| | | | | |
|---|---|---|---|---|
| 3,149,435 A * | 9/1964 | Nordeen | | 43/26.1 |
| 3,203,131 A * | 8/1965 | Myers | | 43/26.1 |
| 3,358,399 A * | 12/1967 | Waldmann | | 43/4 |
| 3,462,870 A * | 8/1969 | Terilli | | 43/4 |
| 3,574,966 A * | 4/1971 | Sullivan | | 43/26.1 |
| 3,599,370 A * | 8/1971 | Armata et al. | | 43/26.1 |
| 3,654,723 A * | 4/1972 | Mercer | | 43/26.1 |
| 3,710,500 A * | 1/1973 | Pena | | 43/26.1 |
| 3,739,516 A * | 6/1973 | Holling | | 43/26.1 |
| 3,747,248 A * | 7/1973 | Baer | | 43/43.13 |
| 3,758,975 A * | 9/1973 | Curtis | | 43/26.1 |
| 3,760,762 A * | 9/1973 | Spongberg | | 43/43.13 |
| 3,793,761 A * | 2/1974 | Bonham | | 43/26.1 |
| 3,878,634 A * | 4/1975 | Quimpo | | 43/4 |
| 3,911,609 A * | 10/1975 | Baya | | 43/26.1 |
| 4,161,077 A * | 7/1979 | Ciaccio et al. | | 43/26.1 |
| 4,237,642 A * | 12/1980 | Petorella | | 43/26.1 |
| 4,321,766 A * | 3/1982 | Henderson | | 43/4 |
| 4,339,888 A * | 7/1982 | Sheng-Jung | | 43/26.1 |
| 4,516,348 A * | 5/1985 | Hirose et al. | | 43/4 |
| 4,635,391 A * | 1/1987 | Early | | 43/26.1 |
| 4,638,585 A * | 1/1987 | Korte | | 43/26.1 |
| 4,648,194 A * | 3/1987 | Carroll, Jr. | | 43/4.5 |
| 4,752,878 A * | 6/1988 | Sigurdsson et al. | | 43/4 |
| 4,757,633 A * | 7/1988 | Van Cleve | | 43/26.1 |
| 4,793,088 A * | 12/1988 | Fortuna | | 43/26.1 |
| 4,798,021 A * | 1/1989 | Miklos | | 43/26.1 |
| 4,825,580 A * | 5/1989 | Gray | | 43/44.9 |
| 4,856,222 A * | 8/1989 | Hannam | | 43/26.1 |
| 5,004,181 A * | 4/1991 | Fowles | | 43/26.1 |
| 5,016,385 A * | 5/1991 | Blease | | 43/26.1 |
| 5,077,929 A * | 1/1992 | Khan | | 43/26.1 |
| 5,086,581 A * | 2/1992 | Barra et al. | | 43/26.1 |
| 5,154,016 A * | 10/1992 | Fedora et al. | | 43/26.1 |
| 5,165,193 A * | 11/1992 | Dankwardt | | 43/26.1 |
| 5,201,884 A * | 4/1993 | Nicholas | | 43/26.1 |
| 5,293,712 A * | 3/1994 | Lo | | 43/26.1 |
| 5,309,664 A * | 5/1994 | Wright | | 43/26.1 |
| 5,361,530 A * | 11/1994 | Kashani et al. | | 43/26.1 |
| 5,363,587 A * | 11/1994 | Nordling | | 43/26.1 |
| 5,483,767 A * | 1/1996 | Langer | | 43/4 |
| 5,511,335 A * | 4/1996 | Langer | | 43/4 |
| 5,581,932 A * | 12/1996 | Bell | | 43/26.1 |
| 5,615,513 A * | 4/1997 | Luna | | 43/43.13 |
| 5,732,500 A * | 3/1998 | Fitzpatrick | | 43/4 |
| 5,782,033 A * | 7/1998 | Park et al. | | 43/4 |
| 5,797,209 A * | 8/1998 | Nicholas | | 43/4 |
| 5,806,232 A * | 9/1998 | James | | 43/26.1 |
| 5,819,465 A * | 10/1998 | Bryant | | 43/4 |
| 6,122,852 A * | 9/2000 | Mechling, IV | | 43/4 |
| 6,263,611 B1 * | 7/2001 | Kimura | | 43/26.1 |
| 6,389,732 B1 * | 5/2002 | Daniel | | 43/26.1 |
| 6,520,105 B2 * | 2/2003 | Koda et al. | | 43/26.1 |
| 6,880,285 B1 * | 4/2005 | Frost et al. | | 43/15 |
| 6,925,746 B2 * | 8/2005 | Huikari | | 43/26.1 |
| 7,055,280 B2 * | 6/2006 | Shen et al. | | 43/26.1 |
| 7,748,156 B2 * | 7/2010 | Blum | | 43/26.1 |
| 2002/0095850 A1 * | 7/2002 | Jones | | 43/4 |
| 2004/0083642 A1 * | 5/2004 | Huikari | | 43/26.1 |
| 2005/0102883 A1 * | 5/2005 | Temes | | 43/26.1 |
| 2006/0059766 A1 * | 3/2006 | Huikari | | 43/26.1 |
| 2008/0271357 A1 * | 11/2008 | Easterby | | 43/26.1 |

FOREIGN PATENT DOCUMENTS

| | | |
|---|---|---|
| EP | 1023830 A1 * | 8/2000 |
| FR | 2612047 A1 * | 9/1988 |
| GB | 2200823 A * | 8/1988 |
| JP | 08116843 A * | 5/1996 |
| JP | 09037692 A * | 2/1997 |
| JP | 2001095447 A * | 4/2001 |
| WO | WO 02080665 A1 * | 10/2002 |

* cited by examiner

REMOTELY OPERABLE BAIT DEPLOYING SYSTEM AND ASSOCIATED METHOD

CROSS REFERENCE TO RELATED APPLICATIONS

This is a continuation-in-part application of U.S. patent application Ser. No. 11/998,312, filed Nov. 29, 2007 now abandoned, which claims the benefit of U.S. Provisional Application No. 60/861,291, filed Nov. 29, 2006, now abandoned, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to bait deploying systems and, more particularly, to a remotely operable bait deploying system for steering fishing lines into target zones underwater.

2. Prior Art

Fishing is one of the most beloved sports enjoyed by Americans. The estimated number of U.S. recreational anglers is well over 50 million, with more participants than golfing and tennis combined. Economic figures supplied by the American Sportfishing Association confirm that fishing is an enduring American tradition for people of all ages and walks of life. As fun as leisurely fishing can be, this sport does tend to present some challenges. Particularly, casting a line so that it reaches a fruitful spot in the water can be a time-consuming endeavor. When using a standard fishing pole, many fishermen have no choice but to wait for a fish to find a stationary fishing line. Better luck can be had when using a rod and reel pole, as these devices allow the user to move the line through the water in hopes of attracting a fish.

However, even rod and reel users are playing a guessing game, and still may not happen upon a choice spot that can yield a big catch. Based on the above mentioned needs, it would be advantageous to provide a means for assisting a user to control a casted fishing line.

U.S. Pat. No. 5,165,193 to Dankwardt discloses a fishing procedure enhanced by utilization of a boat member operatively directed by utilizing a transmitter, with a receiver mounted within the boat member to selectively actuate a drive motor and rudder therewithin. The boat member includes a boat deck, and the boat deck includes a door plate, wherein the door plane utilizes a spring hinge to normally bias the door plate at an oblique including angle between the deck and the door plate for a first latched position mounting the door plate in a parallel relationship relative to the boat deck. The door plate is arranged to position a fishing hook of an associated fishing line to remotely position a fishing pole and permit directing of the fishing hook to a spaced relationship in a body of water prior to its projection into the body of water by disengaging the door plate relative to the boat deck. Unfortunately, this prior art example is not designed for permitting youngsters to quickly master the art of cast fishing.

U.S. Pat. No. 5,806,232 to James discloses a radio controlled fishing bait boat for delivering a baited fishing line to a remote location. The hull has a recessed channel on the lower side in which a propeller and a rudder are mounted. A convex deck cover covers a top portion of the hull. In the interior of the hull, battery-powered electric motors for controlling the propeller and the rudder, batteries, and a controller are arranged. Pivotable hatches are provided in the stern transom for access to bait storage compartments in the interior of the hull. A baited fishing line is loaded into the bait storage compartment. The bait boat is directed to a desired fishing location by use of a hand-held radio transmitter which sends signals to the bait boat to control its speed and direction. Once the boat has reached the desired fishing location, the fishing line is tugged to pull the baited fishing line out of the bait storage compartment and into the water. The design of the hull and the weight distribution of the boat allow the boat to duck under breaking waves to stably and effectively move through surf to a desired fishing location. Unfortunately, this prior art example is not designed for permitting youngsters to quickly master the art of cast fishing.

U.S. Pat. No. 6,520,105 to Koda discloses a remote control unmanned fishing boat intended for enjoyment of remote control fishing and a remote control device for use with the boat. The invention contemplates enabling the operator to advance the boat forward and backward and change the direction of the advance of the boat by manipulating the remote control device. By the operator using the remote control device for actuating a depth sounder, the information concerning the depth of water and the condition of water bottom determined by the depth sounder is displayed on a monitor of the remote control device. When the optimum position for fishing is found consequently, the operator is allowed to lower his fishhook in the water by manipulating the remote control device. Unfortunately, this prior art example is not designed for permitting youngsters to quickly master the art of cast fishing.

Accordingly, the present invention is disclosed in order to overcome the above noted shortcomings. The present invention is convenient and easy to use, light weight yet durable in design, and designed for steering fishing lines into target zones underwater. The remotely operable fish bait deploying system is simple to use, inexpensive, and designed for many years of repeated use.

BRIEF SUMMARY OF THE INVENTION

In view of the foregoing background, it is therefore an object of the present invention to provide an apparatus for steering fishing lines into target zones underwater. These and other objects, features, and advantages of the invention are provided by a remotely operable fish bait deploying system including a remote controller adapted to be carried by a user, a fishing rod spaced from the remote controller, and a toy vessel anchored to the fishing rod.

The toy vessel preferably includes an on-board controller in wireless communication with the remote controller, a motorized propeller communicatively coupled to the on-board controller for propelling the toy vessel in a body of water, and an actuator interface communicatively coupled to the on-board controller.

A first primary line is anchored to the toy vessel and extends rearwardly therefrom respectively. Such a first primary line is connected to the fishing rod. A second primary line is adjustably connected to the actuator interface and trails behind the toy vessel. In this manner, the actuator interface automatically adjusts a longitudinal length of the second primary line based upon instructions received from the on-board controller.

A plurality of flotation members are directly coupled to the second primary line respectively and remain spaced from the first primary line. A plurality of auxiliary lines are directly anchored to each of the flotation members and terminate underwater wherein each auxiliary line is provided with a hook attached to a distal end thereof for holding bait.

Notably, the first primary line is automatically extendable and retractable from the fishing rod as the motorized propeller displaces the toy vessel such that the user can remotely control placement of the auxiliary lines in the water.

In a preferred embodiment, the remote controller includes a user interface that generates multiple control signals based upon corresponding user inputs, and a frequency generating circuit electrically coupled directly to the user interface. Such a frequency generating circuit modifies the control signals to desired frequency levels respectively. An amplifier is electrically coupled to the frequency generating circuit for increasing a voltage level of each of the control signals, and a transmitter transmits the amplified control signals to the toy vessel.

Each of the flotation members preferably include a mechanism for automatically retracting the auxiliary lines along a substantially vertical path when a fish bites bait attached to the hooks. Such an automatic retracting mechanism preferably includes a retractable spring-loaded pulley, a sensor connected to the spring-loaded pulley, and a transducer communicatively coupled to the sensor. In this manner, a corresponding one of the auxiliary lines is coupled to the spring-loaded pulley and automatically is biased to an equilibrium position after being extended to an elongated tensed position respectively. Advantageously, the sensor automatically activates the transducer by generating and transmitting a notification signal to the transducer when the auxiliary line is displaced from the tensed position.

In one embodiment, the actuator interface preferably includes a motor having a shaft coupled thereto and is responsive to the control signals from on-board controller. A rotatable spool is directly coupled to the first shaft and thereby reels the second primary line between alternate positions as desired by the user.

The toy vessel further includes a eyelet fixedly attached to a rear portion thereof wherein the first primary line is anchored to the eyelet such that the first primary line remains at a static position when the toy vessel is stationary.

In one embodiment, the second primary line is independently retractable between wound and unwound positions while the first primary line is at the static position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
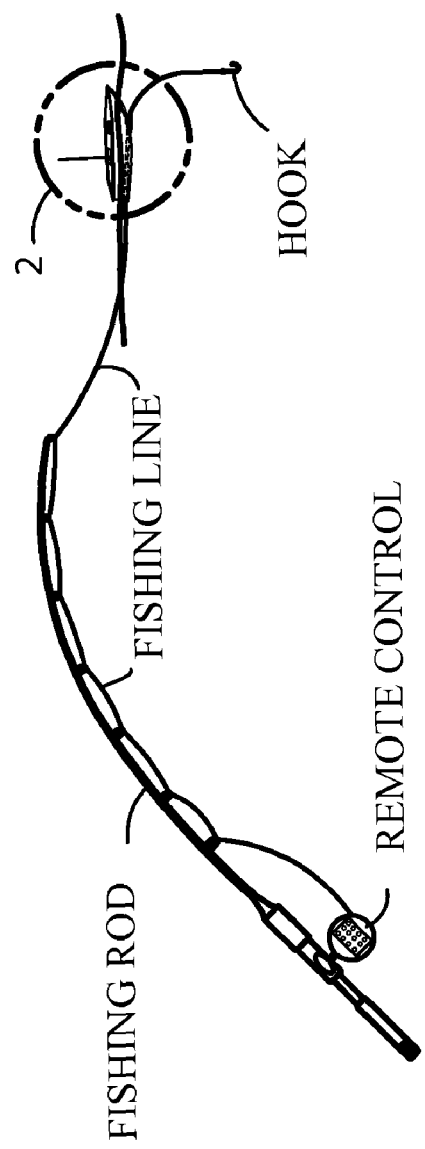
FIG. 1 is a perspective view showing a fish bait deploying system, in accordance with the present invention.
Figure 2:
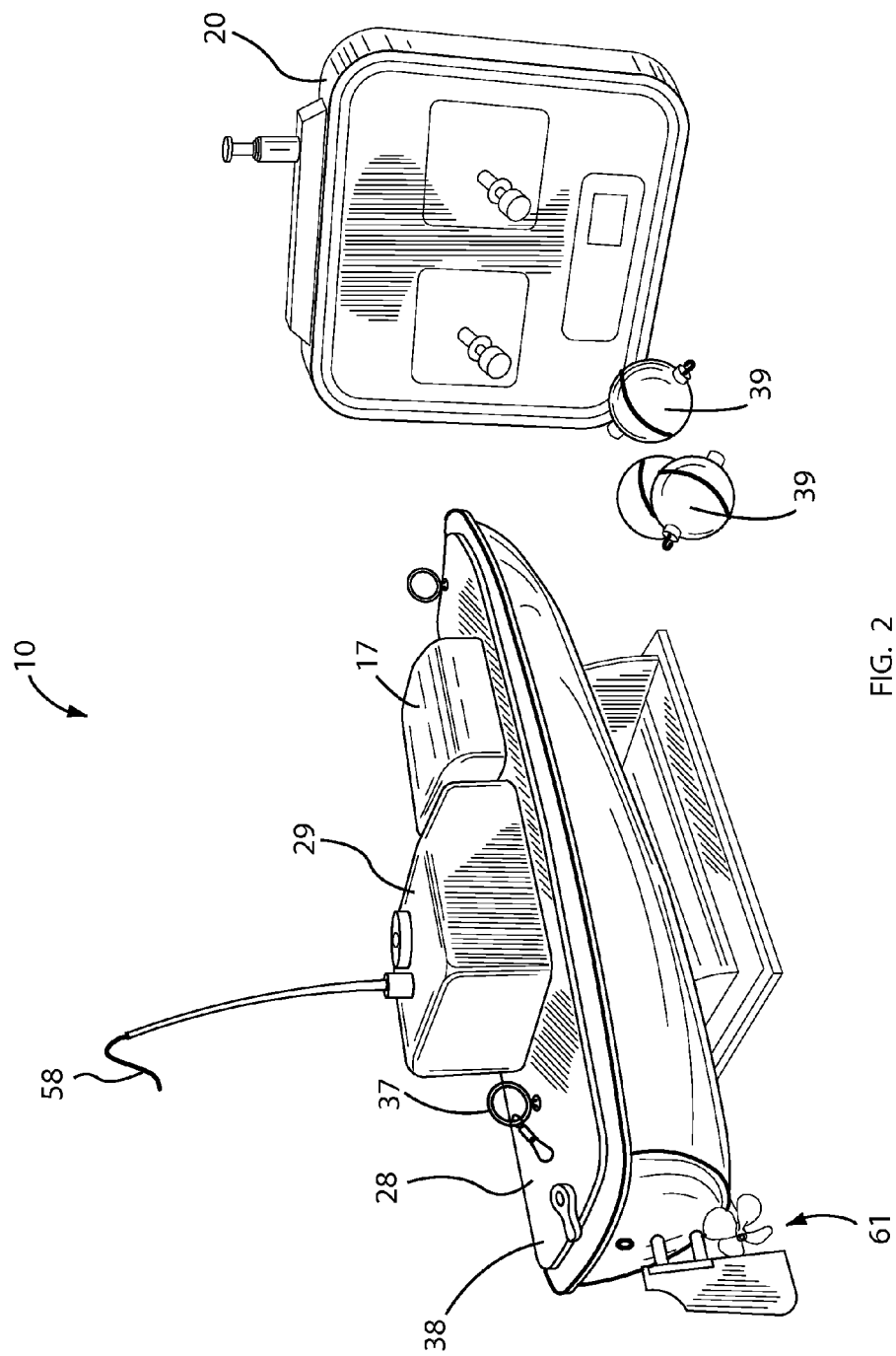
FIG. 2 is another perspective view showing the remote controller, the toy vessel and the flotation members, respectively.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide a fish bait deploying system 10. It should be understood that the system 10 may be used to deploy many different types of bait and can be used with a variety of fishing rods 12. These and other objects, features, and advantages of the invention are provided by a remotely operable fish bait deploying system 10 including a remote controller 20 adapted to be carried by a user, a fishing rod 12 spaced from the remote controller 20, and a toy vessel 28 anchored to the fishing rod 12.

The toy vessel 28 preferably includes an on-board controller 26 in wireless communication with the remote controller 20, a motorized propeller 61 communicatively coupled to the on-board controller 26 for propelling the toy vessel 28 in a body of water, and an actuator interface 29 communicatively coupled to the on-board controller 26.

The toy vessel 28 further includes an eyelet 37 fixedly attached to a rear portion 38 thereof. A first primary line 35 is anchored to the toy vessel 28 and extends rearwardly therefrom respectively. In particular, the first primary line 35 is anchored to the eyelet 37 such that the first primary line 35 remains at a static position when the toy vessel 28 is stationary. Such a first primary line 35 is also connected to the fishing rod 12 so the user can manually reel in the toy vessel 28, if needed.

A second primary line 36 is adjustably connected to the actuator interface 29 and trails behind the toy vessel 28. In this manner, the actuator interface 29 automatically adjusts a longitudinal length of the second primary line 36 based upon instructions received from the on-board controller 26.

A plurality of flotation members 39 are directly coupled to the second primary line 36 respectively and remain spaced from the first primary line 35. A plurality of auxiliary lines 41 are directly anchored to each of the flotation members 39 and terminate underwater wherein each auxiliary line is provided with a hook attached to a distal end thereof for holding bait.

Notably, the first primary line 35 is automatically extendable and retractable from the fishing rod 12 as the motorized propeller 61 displaces the toy vessel 28. In this manner, user remotely controls placement of the toy vessel 28 in the water, without having to maintain access to the fishing rod 12. For example, a user may take cover under a shaded tree that is remotely spaced from the fishing rod 12.

Figure 4:
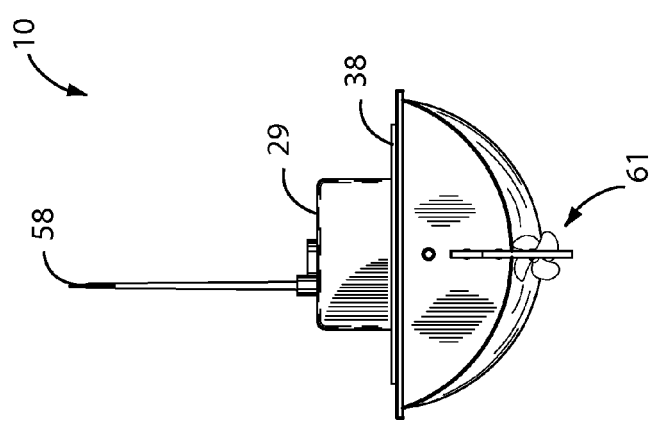
FIG. 4 is a schematic block diagram showing the wireless communication between the remote controller and on-board controller of the toy vessel.

Referring to FIG. 4, the remote controller 20 includes a user interface 21 that generates multiple control signals based upon corresponding user inputs, and a frequency generating circuit 22 electrically coupled directly to the user interface 21. Such a frequency generating circuit 22 modifies the control signals to desired frequency levels, respectively. An amplifier 23 is electrically coupled to the frequency generating circuit 22 for increasing a voltage level of each control signal, and a transmitter 24 transmits the amplified control signals to the toy vessel 28.

Figure 5:
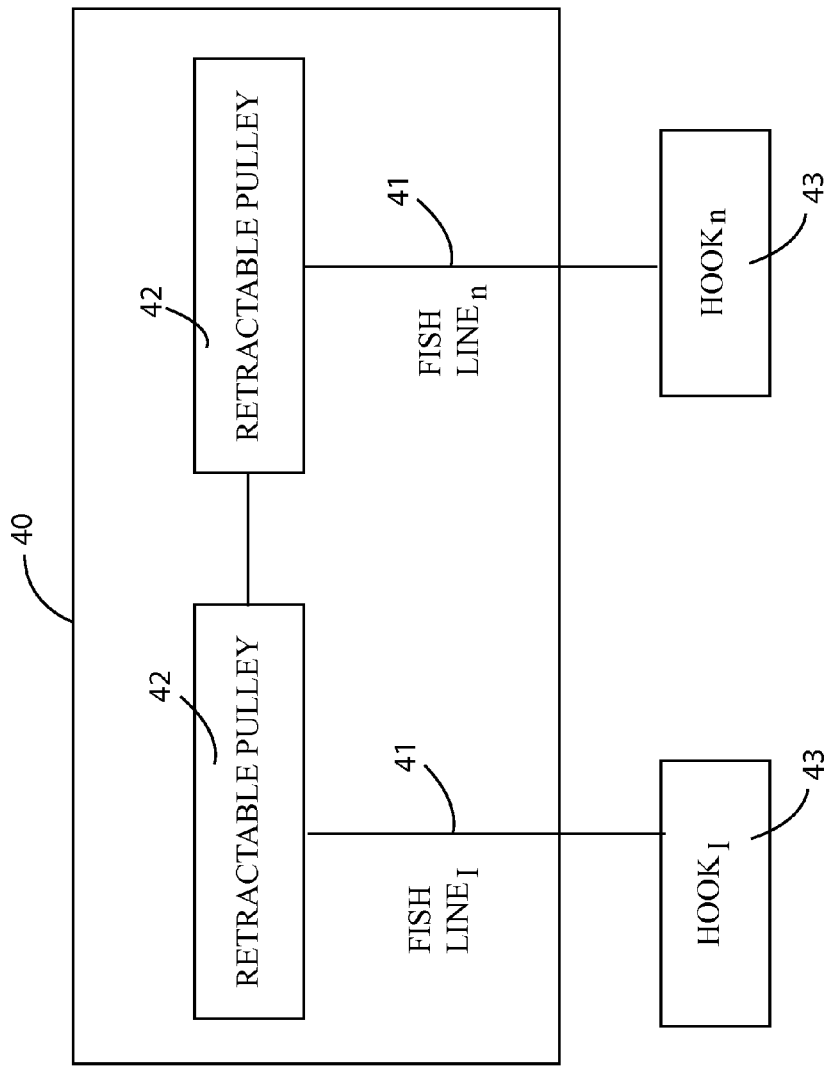
FIG. 5 is a schematic block diagram showing the interrelationship between the toy vessel components and the flotation member components.

Referring to FIG. 5, each of the flotation members 39 preferably include a mechanism 40 for automatically retracting the auxiliary lines 41 along a substantially vertical path when a fish bites bait attached to the hooks 43. Such an automatic retracting mechanism 40 preferably includes a retractable spring-loaded pulley 55, a sensor 53 connected to the spring-loaded pulley 55, and a transducer 52 communicatively coupled to the sensor 53. In this manner, a corresponding one of the auxiliary lines 41 is coupled to the spring-loaded pulley 55 and automatically biased to an equilibrium position after being extended to an elongated tensed position, respectively. Advantageously, sensor 53 automatically activates the transducer 52 by generating and transmitting a notification signal to the transducer 52 when the auxiliary line 43 is displaced from the tensed position.

Figure 3:
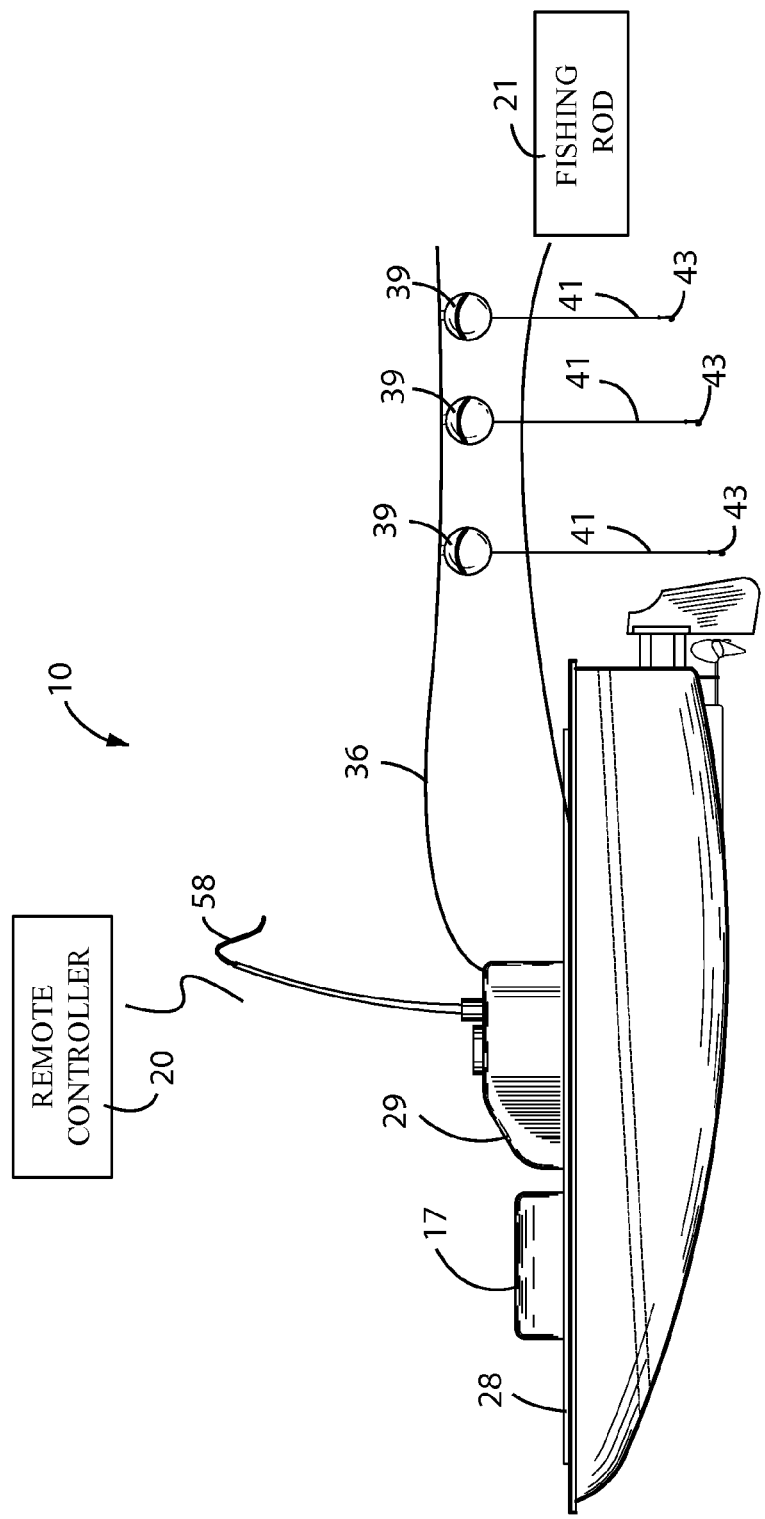
FIG. 3 is a schematic block diagram showing the second primary line connected to both the actuator interface and the flotation members wherein the auxiliary lines are coupled to the automatic retracting mechanism of each flotation member.

Referring to FIG. 3, the actuator interface 29 preferably includes a motor 54 having a shaft 55 coupled thereto and is responsive to the control signals from on-board controller 26. A rotatable spool 56 is directly coupled to the first shaft 55 and thereby reels the second primary line 36 between alternate positions as desired by the user.

In one embodiment, the second primary line 36 is independently retractable between wound and unwound positions while the first primary line 35 is at the static position.

The small, plastic toy vessel 28 is encased within a sturdy, waterproof housing and is externally equipped with multiple primary fishing lines 35, 36 and hooks 43 extending from auxiliary lines 41. In addition, beeping unit 52 is in communication with the pulley 55 for notifying the user when a fish has taken the bait when the auxiliary lines 41 are lowered in the water. The auxiliary lines 41 automatically retract upward after being tugged by the fish. The remote control 20 is kept independent from fishing rod 12 so the user can remain in a comfort zone away from the fishing rod 12. The interior components of the remote control 20 are comprised of a frequency generating circuit 22, amplifier 23, user interface 21, and transmitter 24 encased within the unit's durable plastic. The toy vessel 28 may be powered by a corresponding rechargeable battery source 17 such as lithium, nickel-cadmium, or nickel-metal hydride, as examples.

In use, the remotely operated fishing system 10 is simple and straightforward to use. First, the user hooks the toy vessel 28 to the end of the first primary line 35. Baiting the hooks 43 on the auxiliary lines 41 attached to the second primary line 36, and thereafter lowering the baited lines 41 to a tensed position. The user then pushes the toy vessel 28 out into the water. Next, the user generates an input at the remote control 20 to guide the toy vessel 28 to a desired location in the water and navigates the toy vessel 28 through the water. As is typical with most remote controlled equipment, the companion receiving unit 51, located in the toy vessel 28, is tuned to the specific frequency generated by the transmitter 24 unit.

Upon reception of the signal generated by the transmitter 24, the circuitry in the receiver 51 generates an 'enable' signal to the on-board controller 26 which instructs the motorized propeller 61 and/or the actuating interface 29 to obey the commands set forth from the remote controller 20.

After the user has navigated the toy vessel 28 by remote control 20 and finds a best spot for snagging fish, the baited hooks 43 are triggered by fish. The automatic retracting mechanism 40 then retracts the auxiliary lines 41 and the caught fish up towards the flotation members 39. At this point, the internal beeper 52 at a corresponding flotation member 39 sounds to inform the user that a fish is caught, and the user then uses the remote controller 20 to return the toy vessel 28 and fish to shore.

The present invention, as claimed, provides the unexpected and unpredictable benefit of a system 10 that is convenient and easy to use, is lightweight yet durable in design, and assists a user to control a casted fishing line. Such a system 10 readily navigates fishing lines through the waters. Easily attached to virtually any standard pole or rod and reel assembly, the system 10 works to extend fishing lines to be the best fishing spots underwater so that catches are made with expedience and precision. In this manner, relaxing, fun-filled fishing excursions are not rendered exasperating by the constant recasting of lines and the seemingly unending waits for fish to bite. Such a system 10 is inexpensive and helps anglers with limited skill and mobility enjoy the great pastime of fishing.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A fish bait deploying system for steering fishing lines into target zones underwater, said fish bait deploying system comprising:
   a remote controller;
   a fishing rod;
   a toy vessel anchored to said fishing rod and including
      an on-board controller in wireless communication with said remote controller, a motorized propeller coupled to said on-board controller for propelling said toy vessel in a body of water, and an actuator interface coupled to said on-board controller;

a first primary line anchored to said toy vessel and connected to said fishing rod;

a second primary line connected to said actuator interface;

wherein said actuator interface automatically adjusts a longitudinal length of said second primary line based upon instructions received from said on-board controller;

a plurality of flotation members directly coupled to said second primary line respectively and remaining spaced from said first primary line; and a plurality of auxiliary lines directly anchored to each of said flotation members and terminating underwater, each of said auxiliary lines being provided with a hook attached to a distal end thereof.

2. The fish bait deploying system of claim 1, wherein said remote controller comprises:

a user interface generating multiple control signals based upon corresponding user inputs;

a frequency generating circuit electrically coupled directly to said user interface, said frequency generating circuit modifying said control signals to desired frequency levels respectively;

an amplifier electrically coupled to said frequency generating circuit for increasing a voltage level of each of said control signals; and a transmitter for transmitting the amplified control signals to said toy vessel.

3. The fish bait deploying system of claim 1, wherein each of said flotation members comprises:

means for automatically retracting said auxiliary lines along a substantially vertical path when a fish bites a bait attached to said hooks, said automatic retracting means comprising a retractable spring-loaded pulley, a sensor connected to said spring-loaded pulley, and a transducer communicatively coupled to said sensor;

wherein a corresponding one of said auxiliary lines is coupled to said spring-loaded pulley and automatically biased to an equilibrium position after being extended to an elongated tensed position respectively;

wherein said sensor automatically activates said transducer by generating and transmitting a notification signal to said transducer when said auxiliary line is displaced from said tensed position.

4. The fish bait deploying system of claim 1, wherein said actuator interface comprises:

a motor having a shaft coupled thereto and being responsive to said control signals from said on-board controller; and a rotatable spool directly coupled to said first shaft and thereby reeling said second primary line between alternate positions as desired by the user.

5. The fish bait deploying system of claim 1, wherein said toy vessel further comprises: a eyelet fixedly attached to a rear portion thereof, said first primary line being anchored to said eyelet such that said first primary line remains at a static position when said toy vessel is stationary.

6. The fish bait deploying system of claim 5, wherein said second primary line is independently retractable between wound and unwound positions while said first primary line is at the static position.

7. The fish bait deploying system of claim 5, wherein said auxiliary lines are independently retractable between said tensed and equilibrium positions while said first primary line is at the static position.

8. A fish bait deploying system for steering fishing lines into target zones underwater, said fish bait deploying system comprising:

a remote controller;

a fishing rod;

a toy vessel anchored to said fishing rod and including an on-board controller in wireless communication with said remote controller, a motorized propeller communicatively coupled to said on-board controller for propelling said toy vessel in a body of water, and an actuator interface communicatively coupled to said on-board controller;

a first primary line anchored to said toy vessel and connected to said fishing rod;

a second primary line connected to said actuator interface and trailing behind said toy vessel;

wherein said actuator interface automatically adjusts a longitudinal length of said second primary line based upon instructions received from said on-board controller;

a plurality of flotation members directly coupled to said second primary line respectively and remaining spaced from said first primary line; and a plurality of auxiliary lines directly anchored to each of said flotation members and terminating underwater, each of said auxiliary lines being provided with a hook attached to a distal end thereof;

wherein said first primary line is automatically extendable and retractable from said fishing rod as said motorized propeller displaces said toy vessel such that the user can remotely control placement of said toy vessel in the water.

9. The fish bait deploying system of claim 8, wherein said remote controller comprises:

a user interface generating multiple control signals based upon corresponding user inputs;

a frequency generating circuit electrically coupled directly to said user interface, said frequency generating circuit modifying said control signals to desired frequency levels respectively;

an amplifier electrically coupled to said frequency generating circuit for increasing a voltage level of each of said control signals; and a transmitter for transmitting the amplified control signals to said toy vessel.

10. The fish bait deploying system of claim 8, wherein each of said flotation members comprises:

means for automatically retracting said auxiliary lines along a substantially vertical path when a fish bites a bait attached to said hooks, said automatic retracting means comprising a retractable spring-loaded pulley, a sensor connected to said spring-loaded pulley, and a transducer communicatively coupled to said sensor;

wherein a corresponding one of said auxiliary lines is coupled to said spring-loaded pulley and automatically biased to an equilibrium position after being extended to an elongated tensed position respectively;

wherein said sensor automatically activates said transducer by generating and transmitting a notification signal to said transducer when said auxiliary line is displaced from said tensed position.

11. The fish bait deploying system of claim 8, wherein said actuator interface comprises:
   a motor having a shaft coupled thereto and being responsive to said control signals from said on-board controller; and
   a rotatable spool directly coupled to said first shaft and thereby reeling said second primary line between alternate positions as desired by the user.

12. The fish bait deploying system of claim 8, wherein said toy vessel further comprises: a eyelet fixedly attached to a rear portion thereof, said first primary line being anchored to said eyelet such that said first primary line remains at a static position when said toy vessel is stationary.

13. The fish bait deploying system of claim 12, wherein said second primary line is independently retractable between wound and unwound positions while said first primary line is at the static position.

14. The fish bait deploying system of claim 12, wherein said auxiliary lines are independently retractable between said tensed and equilibrium positions while said first primary line is at the static position.

15. A fish bait deploying system for steering fishing lines into target zones underwater, said fish bait deploying system comprising:
   a remote controller adapted to be carried by a user;
   a fishing rod spaced from said remote controller;
   a toy vessel anchored to said fishing rod and including
      an on-board controller in wireless communication with said remote controller,
      a motorized propeller communicatively coupled to said on-board controller for propelling said toy vessel in a body of water, and
      an actuator interface communicatively coupled to said on-board controller;
   a first primary line anchored to said toy vessel and extending rearwardly therefrom respectively, said first primary line further being connected to said fishing rod;
   a second primary line adjustably connected to said actuator interface and trailing behind said toy vessel;
   wherein said actuator interface automatically adjusts a longitudinal length of said second primary line based upon instructions received from said on-board controller;
   a plurality of flotation members directly coupled to said second primary line respectively and remaining spaced from said first primary line; and
   a plurality of auxiliary lines directly anchored to each of said flotation members and terminating underwater, each of said auxiliary lines being provided with a hook attached to a distal end thereof;
   wherein said first primary line is automatically extendable and retractable from said fishing rod as said motorized propeller displaces said toy vessel such that the user can remotely control placement of said toy vessel in the water.

16. The fish bait deploying system of claim 15, wherein said remote controller comprises:
   a user interface generating multiple control signals based upon corresponding user inputs;
   a frequency generating circuit electrically coupled directly to said user interface, said frequency generating circuit modifying said control signals to desired frequency levels respectively;
   an amplifier electrically coupled to said frequency generating circuit for increasing a voltage level of each of said control signals; and
   a transmitter for transmitting the amplified control signals to said toy vessel.

17. The fish bait deploying system of claim 15, wherein each of said flotation members comprises:
   means for automatically retracting said auxiliary lines along a substantially vertical path when a fish bites a bait attached to said hooks, said automatic retracting means comprising
      a retractable spring-loaded pulley,
      a sensor connected to said spring-loaded pulley, and
      a transducer communicatively coupled to said sensor;
   wherein a corresponding one of said auxiliary lines is coupled to said spring-loaded pulley and automatically biased to an equilibrium position after being extended to an elongated tensed position respectively;
   wherein said sensor automatically activates said transducer by generating and transmitting a notification signal to said transducer when said auxiliary line is displaced from said tensed position.

18. The fish bait deploying system of claim 15, wherein said actuator interface comprises:
   a motor having a shaft coupled thereto and being responsive to said control signals from said on-board controller; and
   a rotatable spool directly coupled to said first shaft and thereby reeling said second primary line between alternate positions as desired by the user.

19. The fish bait deploying system of claim 15, wherein said toy vessel further comprises: a eyelet fixedly attached to a rear portion thereof, said first primary line being anchored to said eyelet such that said first primary line remains at a static position when said toy vessel is stationary.

20. The fish bait deploying system of claim 19, wherein said second primary line is independently retractable between wound and unwound positions while said first primary line is at the static position.

* * * * *